April 16, 1963

R. N. PENNY ET AL 3,085,619

GAS TURBINE ENGINE FUEL SYSTEM

Filed Oct. 7, 1957

APPLICANTS
ROBERT N. PENNY ET AL.
BY
Mawhinney & Mawhinney
ATTORNEYS

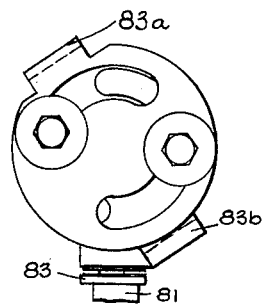
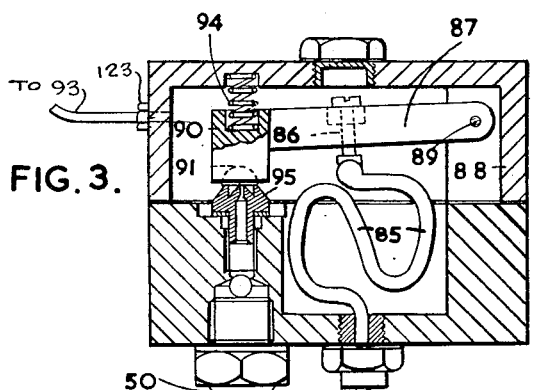
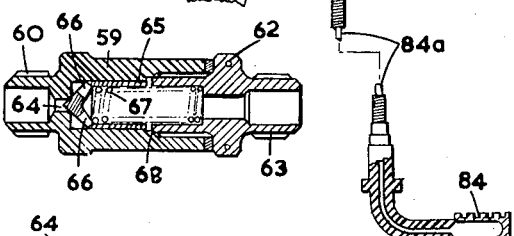
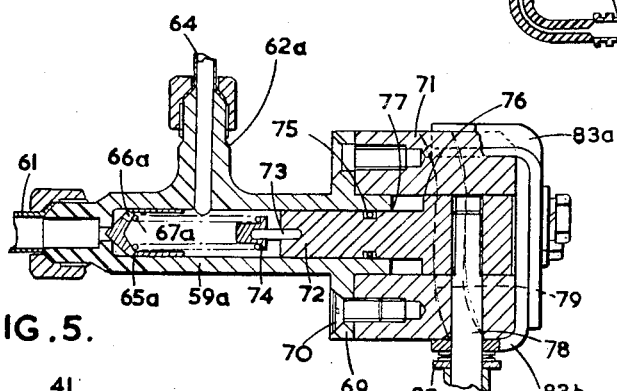
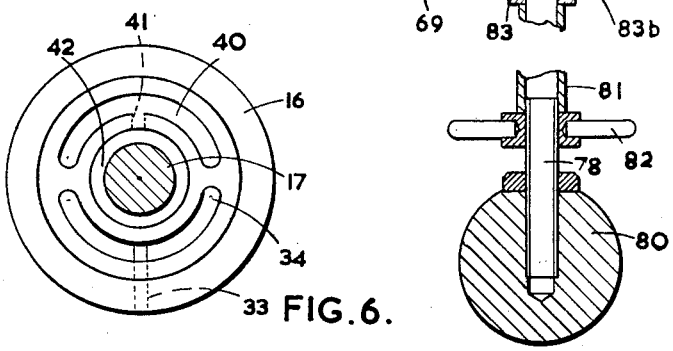
APPLICANTS
ROBERT N. PENNY ET AL
BY Mawhinney & Mawhinney
ATTORNEYS //
United States Patent Office 3,085,619
Patented Apr. 16, 1963

3,085,619
GAS TURBINE ENGINE FUEL SYSTEM
Robert Noel Penny and Charles S. King, Solihull, England, assignors to The Rover Company Limited, Warwickshire, England
Filed Oct. 7, 1957, Ser. No. 688,646
Claims priority, application Great Britain Oct. 11, 1956
1 Claim. (Cl. 158—36.4)

This invention relates to a gas turbine engine fuel system, and it has for its object to provide a fuel system which is particularly, though not exclusively, valuable for gas turbine engines of the smaller kind which are conventionally used for fire pumps, and for other constant or variable speed purposes.

According to the invention, the gas turbine engine fuel system includes a fuel pump and a valve which is entirely carried by and rotatable with an engine-driven part, the valve being arranged to open centrifugally against a bias so as to by-pass fuel from a burner supply back to the pump inlet at a predetermined engine speed. The pump can, for example, have a single bearing and be driven from the engine, and it can be a rotary one of fixed capacity and operating with high efficiency. The rotor of the pump can carry the centrifugally-operable valve.

An optional feature of the system is a fuel-pressure-responsive relief valve interconnecting the pump inlet and outlet.

A further optional feature of the system is a thermally-responsive by-pass valve connected between the inlet and outlet of the pump, the thermally-responsive valve being adapted to open, to by-pass fuel, when some part of the engine reaches a predetermined temperature.

The fuel-pressure-responsive relief valve can be a simple loaded poppet valve spring-biased towards its closed position and adapted to open against the bias at a fuel pressure determined by the spring loading. If desired the spring loading of the fuel-pressure-responsive relief valve can be made adjustable by means such as a screw connected to the end of the spring. By providing this adjustment the valve can be used to control fuel flow to the burner over a predetermined pump speed range below the speed at which the centrifugally-operable valve will open.

The system can include at least one fuel atomiser, fed by the pump, and arranged to inject fuel into a combustion chamber, or chambers, of the engine.

Preferably the pump rotor has a plurality of spring-pressed pistons contained in axial bores in the rotor, the bores being so positioned that during rotation of the rotor the free end of each bore passes successively a fuel inlet and a fuel outlet, the ends of the pistons at the open ends of the bores being acted upon by a fixed, inclined, cam plate so arranged that during a single rotation of the rotor each piston sucks in fuel from the fuel supply inlet and at a later stage expels the fuel into the fuel outlet.

According to another feature the system can include a second centrifugally-operable valve, in parallel with the one first mentioned, to control the minimum speed of the engine and connected to be acted upon by a personally-operable hydraulic actuator such that the speed of the engine can be varied to be at any value between the minimum and maximum speeds.

In the accompanying drawings:

FIGURE 3 is an enlarged section, taken generally on the line 3—3 of FIGURE 1, of the thermally-responsive valve;

FIGURE 4 is a longitudinal section, drawn to an enlarged scale, of the fuel-pressure-responsive valve shown in FIGURE 1;

FIGURE 5 is a longitudinal section of an alternative form of the fuel-pressure-responsive valve which is provided with adjustment means for controlling the fuel flow to the burner over a predetermined range;

FIGURE 5a is an end view of the valve shown in FIGURE 5 in the directon of arrow Va in FIGURE 5;

Figure 1:
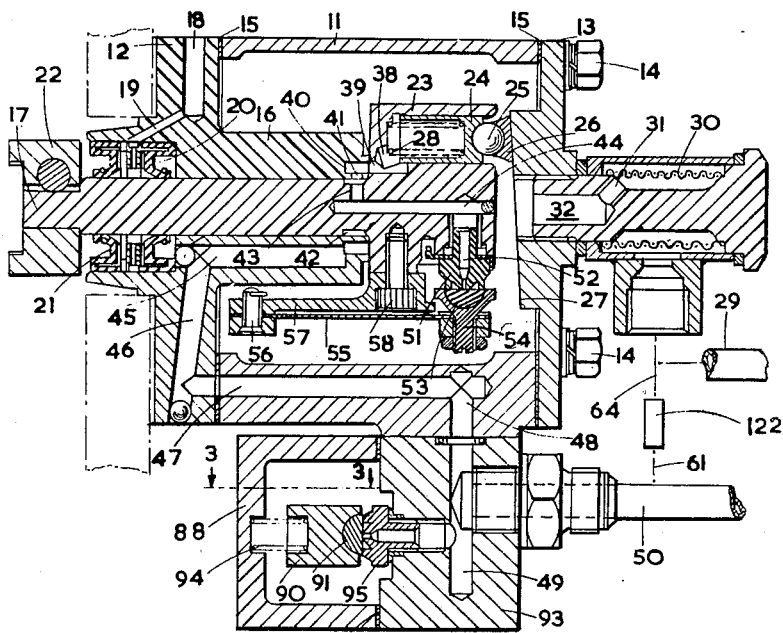
FIGURE 1 is a longitudinal section through a fuel pump and centrifugally-operating valve in accordance with the invention, a fuel-pressure-responsive valve and a thermally-responsive valve also being shown.
Figure 7:
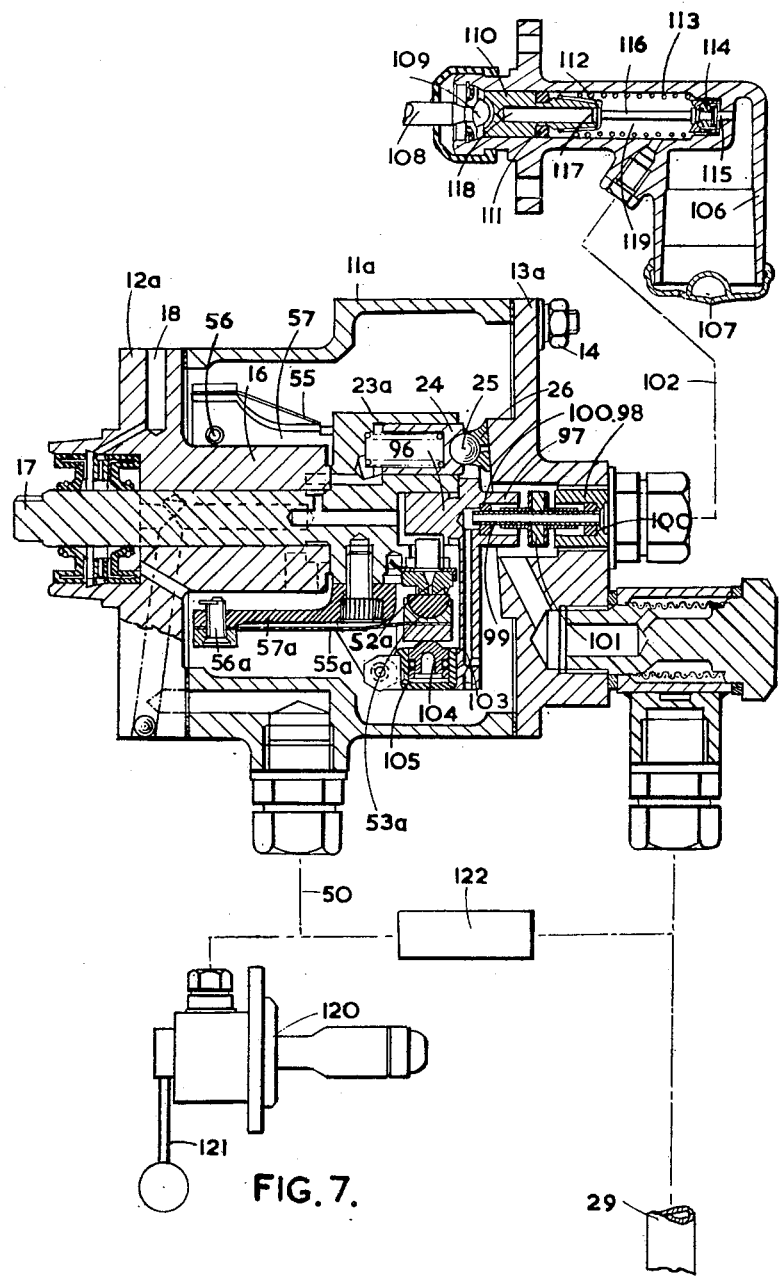

FIGURE 6 is an axial view of a thrust face for the pump rotor, showing fuel inlet and outlet passages; and FIGURE 7 is a view similar to FIGURE 1, but shows a second centrifugally-operable valve acted upon by a hydraulic actuator (of which an associated hydraulic cylinder is shown upside down for convenience) for controlling the engine speed between a minimum and the maximum value, the thermally-responsive valve not being shown.

The embodiments illustrated in FIGURES 1 to 4 and 6 involve the use of the fuel system in a small constant-speed gas turbine engine of a kind suitable for use in driving a fire-pump or an electricity generator. The fuel pump is driven from the main shaft of the engine, the rotor of the pump being geared to the main shaft so that the speed, and therefore the output, of the pump is a function of the engine compressor and turbine speed.

Figure 2:
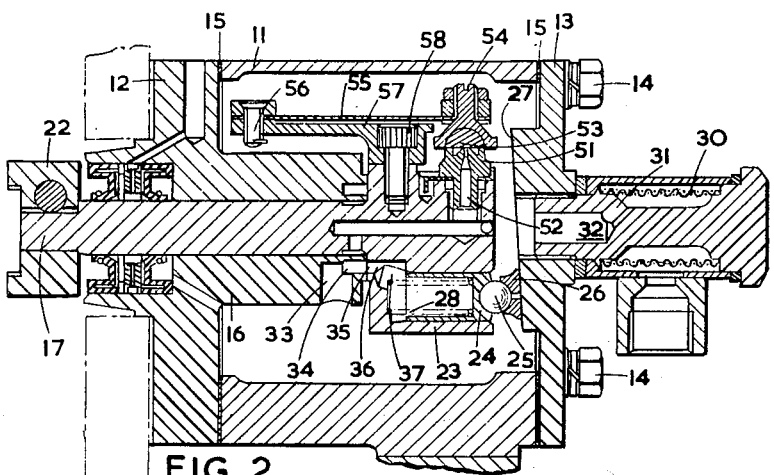
FIGURE 2 is a similar view of the pump and centrifugally-operating valve, but with the pump rotor shown rotated through 180 degrees.

Referring now mainly to FIGURES 1 and 2, the fuel pump body includes a barrel 11 secured between end plates 12 and 13 by a ring of bolts 14 of which only the heads are shown, intervening gaskets being shown at 15, 15.

The end plate 12 has an inwardly-directed hub 16 with a bore providing a long bearing for the pump rotor shaft 17, any leakage past shaft seals 20 and 21 being led away through ducts 18 and 19 of the plate 12. The outer end of the shaft is adapted at 22 for connection to a driven shaft (not shown) of the engine.

At the inner end of the shaft 17 is an integral rotor 23 provided with a circular arrangement of axial bores in which are respective, thimble-like pistons 24, one only of which is shown in each figure. The head of each piston has a part-spherical recess in which is accommodated a ball 25 engaged in a similar recess in a shoe 26 which is held up to a cam track 27, integral with end plate 13, by a spring 28 reacting between the underside of the piston head and the inner end of the coacting bore. It will be seen that the pistons 24 are reciprocated during rotation of the rotor by the conjoint action of the cam track and springs.

Liquid fuel from a reservoir (not shown) is delivered from a supply pipe 29, and through a filter 30, and ducts 31 and 32, into the hollow interior of the pump body. In FIGURE 2 the piston 24 is shown at the end of its outward stroke, having inspired a charge of fuel, from the interior of the pump body, through a radial duct 33 of the hub 16, an arcuate recess 34 in the thrust face 35 of the hub, and communicating ducts 36 and 37 of the pump rotor. The arcuate length of the recess 34 is such as to maintain communication with the duct 36 throughout the induction stroke of the piston as can be appreciated from FIGURE 6.

In FIGURE 1 the piston is shown in its innermost position, after 180 degrees of travel from the position shown in FIGURE 2, and in this position it has discharged its charge of fuel through communicating ducts 38 and 39 of the rotor and into a second arcuate recess 40 in the thrust face of the hub. This recess is of sufficient arcuate length to maintain communication with the duct 39 during the whole of the inward stroke of the piston, and it communicates, through a radial duct 41 of the hub, with an annular groove 42 in the shaft 17. The shaft also has a radial duct 43 which communicates with an axial bore 44 leading to the centrifugally-operated valve, and the annular groove 42 communicates through ducts 45 and 46, in the hub and end plate 12, with ducts 47 and 48 in the barrel 11 which, in turn, communicate with a duct 49 in the housing of the thermally-responsive valve (presently to be described) from which the fuel is led through a pipe 50 to the burner.

The centrifugally-operated valve includes a body part 51 which is screw-threadedly engaged with the rotor for a duct 52 to be directed radially. The outer end of the duct 52 coacts with a half-ball valve member 53 which is held in a cupped end of a stem 54 made fast, by nuts as shown, with the free end of a leaf spring 55. The opposite end of the leaf spring is made fast by a screw 56 with a bracket 57 which is secured by a screw 58 to the rotor.

It will be seen that the duct 52 forms a by-pass, for fuel intended to pass through the pipe 50, when the rotor speed is such that the half-ball valve 53 is lifted off its seat by the centrifugal effort acting in opposition to the spring 55. In this way the maximum speed developed by the turbine can be controlled by a by-passing of the fuel from the burner.

The burner will normally be one provided with a shut-off valve in the fuel supply, such a burner being illustrated generally at 120 in FIGURE 7 (presently to be described), a manual control member for the shut-off valve being shown at 121. To allow of the burner being shut-down while the plant of FIGURES 1 and 2 is running, use is made of a by-pass valve which is indicated generally in FIGURE 1 at 122 and is shown in greater detail in FIGURE 4.

It will be seen from the last-mentioned figure that the by-pass valve includes a body 59 having a screw-threaded end 60 adapted for connection to a branch pipe (indicated at 61 in FIGURE 1) from the pipe 50. The opposite end of the body has a screw-threaded bore to receive an outlet part 62 provided with an external screw-thread 63 for a pipe (indicated at 64 in FIGURE 1) communicating with the supply pipe 29, and through the filter 30, with the pump inlet. The inlet end of the body 59 contains a duct 64 providing a seating for the conical nose of a hollow valve member 65, the latter having a ring of ports 66 clear of the seating and being biassed towards its closed position by an internal spring 67 reacting against the inner end of the part 62. The end 68 of the latter provides an abutment for the valve 65 whereby to limit its extent of opening. It will be seen that the by-pass valve will remain closed until the pressure in the pipe 61 rises to a sufficient extent (e.g., due to shutting off the burner) to move the valve member 65 off its seat for the pump output to pass through the ports 66, and piipe 64, back to the pump inlet.

The modification of the by-pass valve illustrated by FIGURES 5 and 5a also permits the fuel supply to the burner to be manually controlled below the limit imposed by the centrifugally-operating valve. In FIGURE 5, in which like parts are indicated by the same reference numerals suffixed "a," the valve body 59a has an integral outlet part 62a extending laterally therefrom, and it has a flange 69 up to which is held, by screws 70, a cylindrical member 71. Within the latter, and a bore of the body 59a, is guided an axially-movable actuator 72 which, at its inner end, houses a thrust rod 73 seating in a recess of a retainer 74 for the adjacent end of the spring 67a. The actuator has an annular groove containing a sealing ring 75 for coaction with the guiding bore of the body 59a, and the portion of the actuator which is guided in the member 71 is of larger diameter so as to present a shoulder 76 towards an end face 77 of the said body. Radially fast with the actuator is a stem 78, of a handle, which extends through a helical slot 79 of the cylindrical member 71 so that as the handle is rotated about the axis of the actuator the degree of compression applied to the spring 67a is adjusted in such manner that the valve will open at a predetermined fuel pressure in the pipe 61. In this way it can be arranged for some of the burner fuel supply to be by-passed back to the pump inlet at pump speeds which are less than the predetermined one at which the centrifugally-operated valve will open.

As shown in FIGURES 5 and 5a, the stem 78 carries an operating knob 80 at its outer end and it is surrounded by a sleeve 81 with finger lodgements 82 by which it can be retracted to disengage clutch means 83 for holding the actuator in an adjusted position. Adjustable stops are shown at 83a and 83b.

The minimum setting of the fuel-pressure-responsive valve can be used to prevent the speed of the engine falling below a predetermined idling speed which can be selected to be such that the range of required fuel flows, and therefore pressures, is substantially constant.

If the fuel-pressure-responsive valve is adjusted to its maximum setting, it will be arranged for it to remain closed so that the centrifugally-operated valve will act to maintain the maximum speed constant. Thus the maximum speed of the engine is always controlled by the centrifugally-operated valve.

Any intermediate speed can be obtained by selecting an intermediate setting of the adjuster of the pressure-responsive valve.

The pressure-responsive valve has the advantage over the normal type of needle or throttle valve of providing a pressure-flow characteristic which will allow stable engine running in all conditions.

The thermally-operated valve shown in FIGURES 1 and 3 is for preventing overheating of a part of the engine, and for this purpose a temperature-responsive element 84 (see FIGURE 3) is placed in a position to be responsive to the temperature of the part to be guarded. The element 84 is hollow and connected by a tube 84a to a Bourdon tube 85, the interiors of these being filled with mercury or some other suitable fluid. The Bourdon tube is set to act on a screw 86 attached to a lever 87 of which one end is pivoted to a casing 88 at 89, and the other has a fitting 90 supporting a half-ball valve member 91. The casing is suitably made fast, with an intervening seal 92, to a block 93 which is suitably connected to the barrel 11 and carries the connection for the pipe 50, and a spring 94 biasses the half-ball valve member on to a seating of a valve body 95 screwed into the block 93. Expansion of the Bourdon tube, due to overheating conditions, opens the valve 91, 95 and allows at least some of the pump delivery to be diverted from pipe 50 and, instead, to pass from duct 49 into the interior of the casing 88 from whence it is returned by a passage 123 to the inlet pipe 29 to the pump.

FIGURE 7 illustrates a modified construction in which another form of speed control of the engine is provided. The pump and centrifugally-operable valve are much the same as in FIGURES 1 and 2, similar reference numerals being used to designate like parts, but a second centrifugally-operating valve, subject to modification by a hydraulic actuator, is provided. This actuator, for example, can be operated from a hydraulic cylinder connected to an accelerator pedal, of a vehicle equipped with the fuel system as hereinafter described, or from some other sort of throttle control in other cases. The second centrifugally-operating valve is almost identical with the one previously described, and identical parts are designated by the same reference numerals, suffixed "a."

In this construction the pump rotor 23a is fast with a part 96 providing a hollow boss 97 which is aligned with a hollow member 98 fast with the end wall 13a of the pump body. Extending between bores of the boss and member 98 is a tube 99 with peripheral seals 100 adjacent its ends and having a central spacer 101 for limiting endwise movement. In this way operating fluid, from a hydraulic cylinder which is presently to be described, can be supplied through a pipe 102, and through the tube 99 and a duct 103 in the part 96, to beneath a thimble-like piston 104. This piston works in a cylinder 105 fast with the part 96, and is adapted to be positioned by the hydraulic fluid such as to vary the action of the second centrifugally-operating valve.

The hydraulic cylinder (which, as previously stated has, for convenience, been drawn upside down) comprises a reservoir 106, with a filler cap 107, for the hydraulic fluid, and a valve member which is operable by a rod 108 connected to a vehicle accelerator pedal or other control. The rod 108 has a ball-end 109 which is made captive in a piston 110 having a sealing ring 111, and it carries a retainer 112 for one end of a compression spring 113 of which the other end reacts on a valve member 114 for sealing a duct 115 leading from the reservoir. The valve member 114 is fast with a rod 116 having a head 117 guided in a bore 118 of the piston 110, and the arrangement is such that when the piston is pushed by the rod 108 the duct 115 is sealed and hydraulic fluid in a working space 119 is expressed through the pipe 102 to adjust the pressure acting on the piston 104. When the rod 108 is moved reversely the head 117 is carried with it to open the duct 115, whereby hydraulic fluid can pass from the reservoir to replenish any loss of hydraulic fluid from the working space.

The effort of the spring 55a is arranged to be less than that of the spring 55 so that the second centrifugally-operating valve will open centrifugally at a speed lower than the speed at which the first centrifugally-operating valve will open. When the hydraulic actuator is operated, it adds to the effort of the spring 55a to increase temporarily the speed at which the second centrifugally-operating valve will open, to enable the engine to be run at a speed intermediate the speeds for which the springs 55 and 55a are set.

What we claim as our invention and desire to secure by Letters Patent of the United States is:

A gas turbine engine fuel system including a fuel pump; a fuel inlet to said pump; means defining a delivery flow-path from said pump to a burner of the engine; means defining a by-pass flow-path from said delivery flow-path to said pump inlet; a first valve, arranged to control the flow of fuel through said by-pass flow-path, the entire valve being carried by and rotatable with a rotatable engine-driven part and comprising a first closure member for said by-pass flow-path, a first valve body, including a seating for said first closure member, and first resiliently-biassed means connected between said first valve body and said first closure member, to permit said first closure member to move centrifugally away from its seating at a first predetermined engine speed against a bias imparted by said first resiliently-biassed means; a second valve, arranged in parallel with said first valve to control the flow of fuel through said by-pass flow-path, the entire second valve being carried by and rotatable with said rotatable engine-driven part and comprising a second closure member for said by-pass flow-path, a second valve body, including a seating for said second closure member, and a second resiliently-biassed means connected between said second valve body and said second closure member, to permit said second closure member to move centrifugally away from its seating at a second predetermined engine speed, lower than said first predetermined engine speed, against a bias imparted by said second resiliently-biassed means, and a personally-operable hydraulic actuator operable to add to the bias of said second resiliently-biassed means to increase temporarily said second predetermined engine speed to a value between said second and said first predetermined engine speeds.

References Cited in the file of this patent
UNITED STATES PATENTS

| | | |
|---|---|---|
| 1,751,982 | Dunham | Mar. 25, 1930 |
| 2,404,428 | Bradbury | July 23, 1946 |
| 2,433,954 | Lapsley | Jan. 6, 1948 |
| 2,467,445 | Schwendner | Apr. 19, 1949 |
| 2,560,118 | Malone et al. | July 10, 1951 |
| 2,573,724 | Neal | Nov. 6, 1951 |
| 2,590,853 | Fulton | Apr. 1, 1952 |
| 2,599,507 | Wyckoff | June 3, 1952 |
| 2,644,513 | Mock | July 7, 1953 |
| 2,699,218 | Nims | Jan. 11, 1955 |
| 2,706,384 | Schott | Apr. 19, 1955 |
| 2,874,764 | Booth et al. | Feb. 24, 1959 |
| 2,874,765 | King | Feb. 24, 1959 |